US006945380B2

(12) United States Patent
Sauer

(10) Patent No.: US 6,945,380 B2
(45) Date of Patent: Sep. 20, 2005

(54) INTERMEDIATE STORAGE DEVICE AND PROCESS FOR TRANSPORTING OBJECTS

(75) Inventor: Hartmut Karl Sauer, Himmelstadt (DE)

(73) Assignee: KBA Giori S.A., Lausanne (CH)

( * ) Notice: Subject to any disclaimer, the term of this patent is extended or adjusted under 35 U.S.C. 154(b) by 0 days.

(21) Appl. No.: 10/477,232

(22) PCT Filed: Apr. 4, 2002

(86) PCT No.: PCT/DE02/01221

§ 371 (c)(1),
(2), (4) Date: Dec. 23, 2003

(87) PCT Pub. No.: WO02/098770

PCT Pub. Date: Dec. 12, 2002

(65) Prior Publication Data

US 2004/0149541 A1 Aug. 5, 2004

(30) Foreign Application Priority Data

May 12, 2001 (DE) .......................... 101 23 327

(51) Int. Cl.[7] ............................................. B65G 47/00
(52) U.S. Cl. .............................. 198/339.1; 198/465.1; 198/346.2
(58) Field of Search .................... 198/339.1, 346.2, 198/346.1, 465.3, 801, 465.1

(56) References Cited

U.S. PATENT DOCUMENTS

| | | | | |
|---|---|---|---|---|
| 1,557,776 A | * | 10/1925 | Russell ...................... 198/802 |
| 1,736,866 A | * | 11/1929 | Wagner et al. ........... 198/484.1 |
| 2,274,842 A | * | 3/1942 | McCann .................. 198/465.3 |
| 3,068,987 A | * | 12/1962 | Franklin ...................... 198/427 |
| 3,184,032 A | * | 5/1965 | Jonsson .................... 198/463.4 |
| 3,701,263 A | * | 10/1972 | Barrett .......................... 62/63 |
| 3,939,621 A | | 2/1976 | Giori |
| 3,993,189 A | | 11/1976 | Haimberger et al. |
| 4,058,908 A | * | 11/1977 | Weber .......................... 34/612 |
| 4,252,230 A | * | 2/1981 | Eriksson .................. 198/346.2 |
| 4,808,057 A | | 2/1989 | Gasquoine et al. |
| 4,830,170 A | * | 5/1989 | Focke ..................... 198/347.3 |
| 5,590,507 A | | 1/1997 | Wyssmann |
| 5,919,025 A | | 7/1999 | Naruhiko et al. |

FOREIGN PATENT DOCUMENTS

| | | |
|---|---|---|
| DE | 19908354 A | 9/2000 |
| DE | 19946531 A | 4/2001 |
| EP | 1057758 A | 12/2000 |
| EP | 1067068 A | 1/2001 |

* cited by examiner

*Primary Examiner*—Richard Ridley
(74) *Attorney, Agent, or Firm*—Clifford W. Browning; Woodard, Emhardt, Moriarty, McNett & Henry LLP

(57) ABSTRACT

The invention relates to an intermediate storage device for objects (11) to be transported. Said device comprises a plurality of carriers (9) which circulate on a closed strip and are used for the objects (11), e.g. printed products; an introducing device (12) arranged on a first point of the strip, and used to introduce the printed products (11) into the carriers (9) passing said point; a distribution device (26) arranged on a second point of the strip, and used to distribute the printed products (11) carried by the carriers (9) passing said second point; and a removal device (16) for removing printed products (11) from a carrier (9) in an area of the strip which is displaced between the first and the second point, said area comprising a section (07/08) which is oriented in a first direction and a section (07/08) which is oriented in a second direction opposite the first.

21 Claims, 3 Drawing Sheets

INTERMEDIATE STORAGE DEVICE AND PROCESS FOR TRANSPORTING OBJECTS

Figure 1:
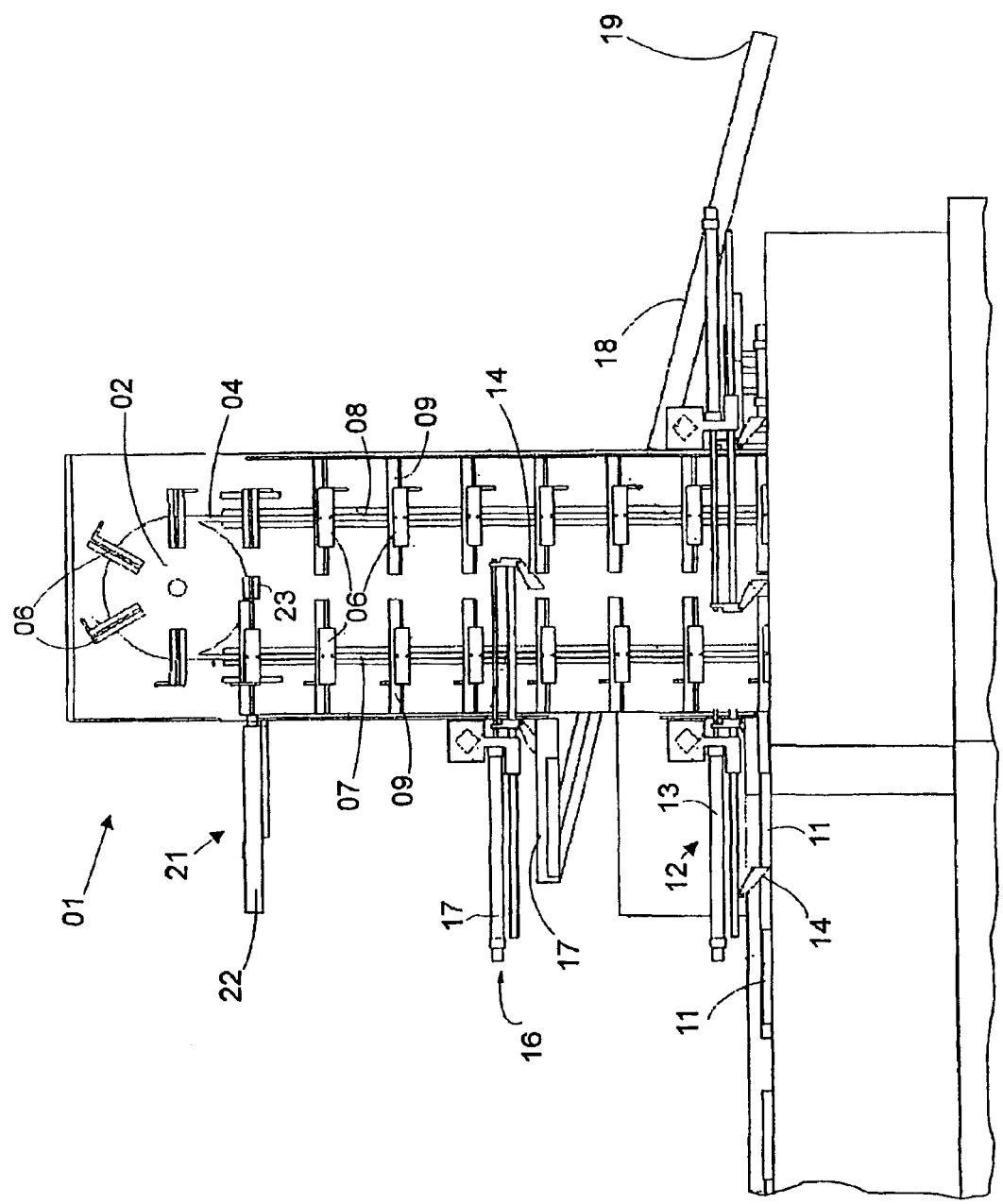

The present invention concerns an intermediate storage device and a process for the transport of objects according to the preamble of claims 1, 3 or 17, in particular for bank notes, that allows a specimen to be extracted from a flow of printed products in current production in order to examine the quality, and after examination re-insert the specimen in the flow of printed products. With numbered printed products, the problem arises that such a specimen must be re-inserted in the flow at precisely the same point from which it was taken in order not to interrupt the sequential numbering of the printed products and thus e.g. to allow completeness checking of the printed products at the end of production.

In the simplest case, such an intermediate storage device can comprise a conveyor device on which the printed products are transported in sequence, allowing an operator to extract printed products for examination, examine these and then re-insert them in the gap resulting from their removal in the flow of printed products. As the gap however moves on further with the flow of printed products during the examination time, the time available for examination is extremely short and high transport speeds of the conveyor device cannot be achieved, which limits the production speed of the entire production line.

EP 1 057 758 A1 and DE 199 08 354 A1 disclose conveyor lines for unit goods with Paternoster systems.

U.S. Pat. No. 3,993,189 A shows a conveyor line with objects placed on carriers, where the carriers are moved by means of a transport device from one section to another section of a vertically moving conveyor.

U.S. Pat. No. 3,939,621 A describes a device for processing stacks of bank notes in which defective stacks are extracted from a transport device for checking and then returned free from defects.

The invention is based on the object of creating an intermediate storage device and a process for the transport of objects.

The object is achieved with the features of claims 1, 3 or 17.

The advantages which can be achieved with the invention lie in particular in that a relatively long intermediate storage time can be achieved on a distance which is relatively short in direct connection between the input device and output device of the intermediate storage device; said time being the longer, the longer the proportion of the sections oriented in the first or second direction in the total length of the conveyor. Thus a specimen can be extracted, examined thoroughly and then re-inserted in the flow of printed products at a slight distance from the point of extraction. Secondly the intermediate storage device allows, with essentially unchanged examination time, a considerable increase in transport speed of the printed products and hence a faster and more economic operation of the printing, cutting and packing machines forming the production line.

Bank notes in general are printed on sheets in a matrix arrangement with several lines and columns. Subsequent cutting of the stacked sheets in the longitudinal and transverse direction leads to a row of adjacent stacks with each working stroke of the cutting machine. Advantageously therefore the intermediate storage device is designed such that in each working stroke it can hold the multiplicity of stacks corresponding to such a row, where in contrast the extraction device for specimen extraction is in each case designed to extract an individual stack.

Preferably the input device picks up the multiplicity of stacks arranged next to each other in the longitudinal direction, corresponding to the arrangement in which the stacks were previously cut from the sheet stack. As the stacks are output by the output device transverse to this longitudinal direction, a gap in the row of stacks created on specimen extraction is retained at the output so that this gap can easily be filled again with the examined stack after output from the intermediate storage device.

The stacks are preferably output onto a conveyor device moving parallel to the longitudinal direction in order thus to convert the flow of the printed products supplied to the intermediate storage device in the form of several adjacent stacks into a flow of individual successive stacks which can then for example be ordered and packed in a subsequent stage of the production line.

An essentially vertical path of the conveyor allows space-saving construction of the intermediate storage device.

On transition of the stack from an upwardly moving section of the conveyor to a downwardly moving one, turning of the stacks should be avoided as a numbering printed on the side of the printed products lying at the top on input into the intermediate storage device should remain visible even after output in order to allow completeness checking before packing. To avoid such turning preferably a device is provided to move the printed products from a first vertical section of the conveyor to a second vertical section of the conveyor moving in the opposite direction.

This pusher device is suitably, like the input and output device and extraction device, active in a rest phase between two movement steps of the conveyor driven in steps.

The movement can be achieved easily and gently if the carriers for the printed products are displaceable on rails oriented transverse to the circulation direction of the conveyor and that the pusher device in each case causes a movement of a carrier together with the printed products it carries from first rails of the first section of the conveyor to second rails of the second section.

To make the transition simpler and safer, the pusher device suitably comprises transitional rails which support a carrier on movement from the first to the second rails.

The input device and output device are preferably each arranged on an upwardly moving section of the conveyor or a downwardly moving section so that above these devices can be arranged a conveyor zone of considerable length which can be used for intermediate storage. The extraction device is suitably arranged on the upwardly moving section of the conveyor in order to be able to utilise the intermediate storage time as completely as possible for quality control.

A transport device which can be gravity-operated in a simple manner suitably serves to transport a specimen taken by the extraction device in the direction of the output device, so that a person or suitable control device can pick up the specimen at the end of the transport device and check it, and then re-insert it in the resulting gap at minimum distance from the point of extraction as soon as said gap reaches or approaches the output device.

An embodiment example of the invention is shown in the drawings and described in more detail below.

THE DRAWINGS SHOW

FIG. 1 a side view of the intermediate storage device

Figure 2:
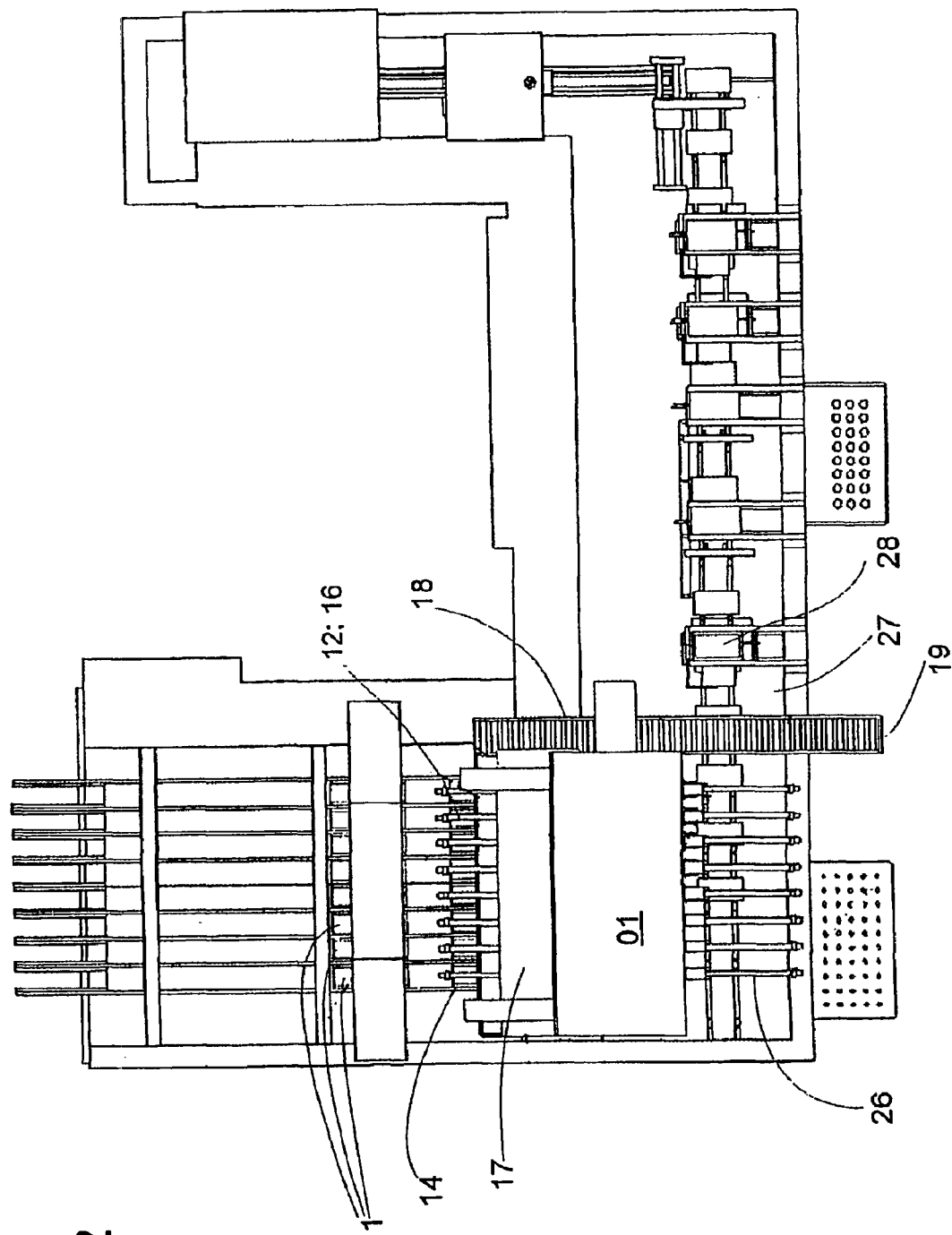
Figure 3:
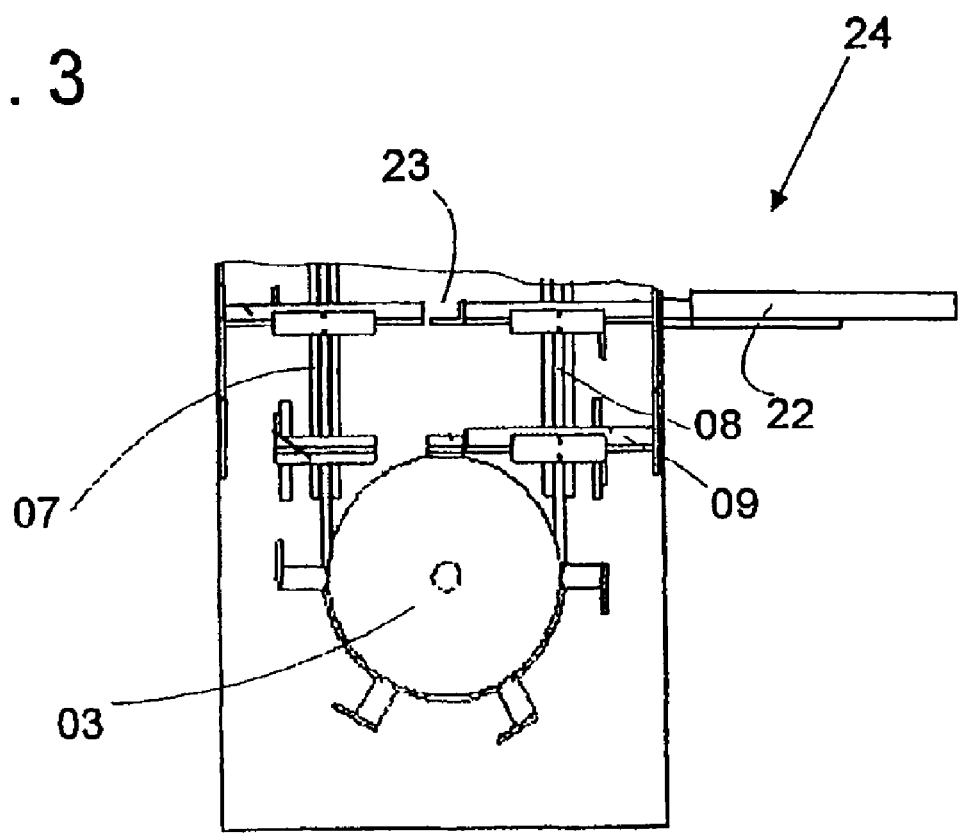

FIG. 2 a top view of the intermediate storage device and its preceding and subsequent devices in a production line for bank notes FIG. 3 the lower turning area of the intermediate storage device of FIG. 1.

FIG. 1 shows an extract from a bank note production line in a side view, where the intermediate storage device 01 is shown cut away. The structure of the intermediate storage device 01 is similar to a Paternoster style system with two endless conveyor means 04, e.g. chains 04, wound around an upper turning wheel 02 and a lower turning wheel 03 (see FIG. 3), on which means are mounted guide rails 06 at regular intervals. The guide rails 06 are rigidly coupled to the chain 04 and extend vertical to this.

Between the two turning wheels 02, 03 extend in each case a vertically upwardly moving section 07 and a downwardly moving section 08 on which horizontally oriented guide rails 06 each hold plate-like conveyor means 09, e.g. carriers 09.

Objects 11, e.g. stacks of bundled bank notes lying next to each other in multiples in a direction perpendicular to the plane of the drawing, are supplied on a belt conveyor device to an input device 12 of the intermediate storage device 01. The input device 12 comprises upwardly and downwardly foldable pushers 14 driven by a drive cylinder 13, e.g. pneumatic cylinder 13, which in the folded-down position shown in FIG. 1 reach behind a row of bank note stacks 11 in order to move these onto an opposing carrier 09 of the intermediate storage device 01. After movement, the pushers 14 are folded up so that they do not collide with a following row of stacks 11, and they return to the position shown in FIG. 1 in order to push the next row of stacks 11 onto a further carrier 09.

Above the input device 12 arranged on the upwardly moving section 07 is an extraction device 16 which serves to extract from the intermediate storage device 01 one stack from a multiplicity of stacks 11 supported on a carrier 09 at the same level. To this end, the extraction device 16 comprises pushers 14 also driven by a pneumatic cylinder 13 in a number which corresponds to the number of stacks 11 supplied next to each other in a row, each of which pushers can be controlled individually in order to extract any one of the stacks 11. The extraction device 16 also comprises a conveyor belt 17 which, as is more clearly shown in the top view in FIG. 2, serves to transport an extracted stack 11 along the front of the intermediate storage device 01 to a transport device 18 in the form of an inclined roller conveyor 18 on which the bundle extracted is passed to a point 19 comfortably accessible to an operator.

The distance between the guide rails 06 of the chain 04 is set such that whenever a carrier 09 is in a position suitable for loading at the input device 12, at the same time a specimen can be extracted at the extraction device 16.

Above the extraction device 16 shortly before reaching the upper turning wheel 02 is arranged a pusher device 21. The pusher device 21 comprises a working cylinder 22 e.g. pneumatic cylinder 22 which serves to push a carrier 09 opposite it from guide rails 06 of the upwardly moving section 09 into opposite empty guide rails 06 of the downwardly moving section 08 which are at the same height having just passed around the upper turning wheel 06. To guarantee that the carrier 09 on movement aligns precisely with the empty guide rails 06, transitional rails 23 are arranged at a suitable height between the two sections 06, 07.

As FIG. 3 shows, a correspondingly constructed pusher device 24 is also provided at the lower end of the downwardly moving section 08 in order, shortly before reaching the lower turning wheel 03, to push the carrier 09 into the upwardly moving section 07.

With the design of intermediate storage device 01 shown in the figures, the transitional rails 23 are clearly shorter than the guide rails 06 mounted on the chain 04 so that it is necessary, in one working stroke of the intermediate storage device 01, to push a carrier 09 from one of the two sections 07, 08 of the circulating conveyor into the other. Alternatively however it is also possible to make the transitional rails 23 so long that they are able to support a carrier 09 (or even several). In this case it would suffice in one working stroke to push a carrier 09 with one of the pusher devices 21, 24 onto the transitional rails, whereby the front carrier 09 held in the transitional rails 23 is pushed onto the guide rails 06 of the opposite section 07 or 08. Thus the stroke required for the pusher devices 21, 24 can be shortened and the transitional rails 23 also contribute to the intermediate storage effect.

The carriers 09 pushed onto the downwardly moving section 08 move downward on this in steps until they reach an output device 26. (FIG. 2) in the vicinity of the lower end of the section 08. An operator can therefore, after performing the necessary checks such as the cutting precision or the strength of the fiscal seal of a stack 11 extracted using the extraction device 16, return this to the input lock station 28 which automatically inserts the stack 11 into the continuously running chain system.

The structure of the output device 26 with pneumatic cylinder and pusher is largely similar to that of the input device 12. It pushes the stack 11 into a conveyor belt device 27 which is stopped during the output process and extends parallel to the orientation of the rows of stacks 11 on the carriers 09.

During a working cycle of the intermediate storage device 01, the loaded conveyor belt device 27 moves continuously past the intermediate storage device 01 until the first empty chain position of the intermediate storage device 01 passes by the first extraction position.

If a gap created in the arrangement of stacks 11 on extraction of a specimen by the extraction device 16 before reaching the output device 26 is not yet refilled, it remains on the conveyor belt device 27 even on output of the stack 11. A bundle removed can therefore, after checking, still be inserted again at its original point even on the conveyor belt device 27.

REFERENCE LIST

01 Intermediate storage device
02 Turning wheel, upper
03 Turning wheel, lower
04 Conveyor means, chain
05 —
06 Guide rails
07 Section, upwardly moving
08 Section, downwardly moving
09 Conveyor means, carrier
10 —
11 Objects, stacks
12 Input device
13 Working cylinder, pneumatic cylinder
14 Pusher
15 —
16 Extraction device
17 Conveyor belt
18 Transport device, roller conveyor
19 Place
20 —
21 Pusher device
22 Working cylinder, pneumatic cylinder
23 Transitional rails 24 Pusher device
25 —
26 Output device
27 Conveyor belt device
28 Input lock station

What is claimed is:

1. Intermediate storage device for stacks of printed products to be transported, with at least one conveyor means guided on first and second sections of a conveyor, on which means is arranged a multiplicity of carriers, with an input device for input of the stacks of printed products at an input point on the conveyor and an output device for output of the stacks of printed products at an output point on the conveyor, wherein on each carrier are arranged several stacks of printed products, wherein an extraction device is provided for selective extraction of stacks of printed products from a carrier between the input device and the output device, and wherein the input device is designed in one working stroke of the intermediate storage device to pick up a multiplicity of stacks of printed products, while the extraction device is designed to extract an individual stack of printed products in one working stroke.

2. Intermediate storage device according to claim 1, wherein said first section of the conveyor is oriented in a first direction and said second section of the conveyor is oriented in a second direction opposite to the first direction.

3. Intermediate storage device according to claim 2, wherein a transporting path of the conveyor between the input point to the output point of the conveyor is longer than a transporting path of the conveyor from the output point to the input point of the conveyor.

4. Intermediate storage device according to claim 1, wherein the extraction device is arranged on the same section of the conveyor as the input device.

5. Intermediate storage device according to claim 1, wherein the input device is designed in each case to move a multiplicity of stacks of printed products arranged in a row onto a carrier transversely to the longitudinal direction of the row.

6. Intermediate storage device according to claim 5, wherein the output device is designed to output a row of stacks of printed products from a carrier transversely to the longitudinal direction of the row.

7. Intermediate storage device according to claim 5, wherein after the output device is arranged a belt conveyor device moving parallel to the longitudinal direction.

8. Intermediate storage device according to claim 1, wherein the conveyor extends essentially vertically.

9. Intermediate storage device according to claim 1, characterized by a pusher device for moving the carriers from the first section of the conveyor to the second section of the conveyor.

10. Intermediate storage device according to claim 9, wherein the conveyor is driven in steps and wherein the pusher device is active in a rest phase between two movement steps of the conveyor.

11. Intermediate storage device according to claim 10, wherein the carriers are supported onto guide rails oriented transverse to the circulation direction of the conveyor, wherein the pusher device in each case causes a movement of a carrier from first guide rails of the first section onto second guide rails of the second section.

12. Intermediate storage device according to claim 11, wherein the pusher device has transitional rails to support a carrier on transition from the first guide rails to the second guide rails.

13. Intermediate storage device according to claim 1, wherein the input device and the output device are arranged on an upwardly moving section and a downwardly moving section respectively of the conveyor.

14. Process for the transport of stacks of printed products wherein a multiplicity of stacks are supplied to an intermediate storage device comprising at least one conveyor means guided on first and second sections of a conveyor, on which means is arranged a multiplicity of carriers, said process comprising the following steps:

supplying the carriers with said stacks at an input point on the conveyor, a multiplicity of stacks being picked-up and transferred onto a carrier during one working stroke of the intermediate storage device, selectively extracting an individual stack out of the multiplicity of stacks carried by one selected carrier during one working stroke of the intermediate storage device, thereby creating a gap among the stacks carried by the said selected carrier, performing a quality control of the extracted stack while remaining stacks arranged on the carriers are transported within the intermediate storage device, returning the extracted stack or a substitute stack to the intermediate storage device in the gap previously created on the said selected carrier, discharging the carriers from said stacks at an output point on the conveyor, a multiplicity of stacks being discharged from a carrier during one working stroke of the intermediate storage device.

15. Process according to claim 14, wherein said carriers are moved within the intermediate storage device along a first upwardly moving section and a second downwardly moving section of a vertically moving conveyor.

16. Process according to claim 15, further comprising the step of moving the carriers from the first section of the conveyor to the second section of the conveyor.

17. Process according to claim 14, wherein a transporting path of the conveyor between the input point and the output point of the conveyor is longer than a transporting path of the conveyor from the output point to the input point of the conveyor.

18. Process according to claim 14, wherein selective extraction of the individual stack is performed on the same section of the conveyor as the input of stacks onto the carriers.

19. Process according to claim 14, wherein, during each working stroke of the intermediate storage device, a multiplicity of stacks arranged in a row are supplied onto a carrier at the input point transversely to the longitudinal direction of the row.

20. Process according to claim 19, further comprising the step of moving the discharged stacks parallel to the said longitudinal direction.

21. Process according to claim 14, further comprising, prior to supplying the carriers with stacks, cutting of a sheet stack into a plurality of individual stacks.

* * * * *